United States Patent
Searle et al.

(10) Patent No.: US 6,502,407 B1
(45) Date of Patent: Jan. 7, 2003

(54) SELF-HEATING OR SELF-COOLING CONTAINERS

(75) Inventors: Matthew J Searle, Bruton (GB); Robert N Richardson, Brockenhurst (GB)

(73) Assignee: Thermotic Developments Limited (GB)

( * ) Notice: Subject to any disclaimer, the term of this patent is extended or adjusted under 35 U.S.C. 154(b) by 0 days.

(21) Appl. No.: 09/959,668

(22) PCT Filed: May 15, 2000

(86) PCT No.: PCT/GB00/01865

§ 371 (c)(1),
(2), (4) Date: Nov. 2, 2001

(87) PCT Pub. No.: WO00/69748

PCT Pub. Date: Nov. 23, 2000

(30) Foreign Application Priority Data

May 13, 1999 (GB) .............................................. 9910984

(51) Int. Cl.[7] .................................................. F25D 5/00
(52) U.S. Cl. ..................... 62/4; 126/263.05; 126/263.09
(58) Field of Search ........................... 62/4; 126/263.01, 126/263.05, 263.08, 263.09

(56) References Cited

U.S. PATENT DOCUMENTS

| | | | |
|---|---|---|---|
| 3,379,025 A | * | 4/1968 | Donnelly .......................... 62/4 |
| 3,970,068 A | | 7/1976 | Sato ................................ 62/4 |
| 4,315,578 A | | 2/1982 | Ludwig, Jr. ................... 220/366 |
| 4,640,264 A | * | 2/1987 | Yamaguchi et al. ............. 62/4 |
| 5,626,022 A | | 5/1997 | Scudder et al. ........ 126/263.01 |
| 6,128,906 A | * | 10/2000 | Sillince ........................... 62/4 |

FOREIGN PATENT DOCUMENTS

| | | |
|---|---|---|
| DE | 198 47 001 A1 | 4/1999 |
| EP | 0 297 724 | 1/1989 |

* cited by examiner

*Primary Examiner*—Ronald Capossela
(74) *Attorney, Agent, or Firm*—Nixon & Vanderhye PC

(57) ABSTRACT

A self-heating container (10) has an internal cavity (22) for its contents and an external cavity (20) for a heating mechanism, for example, comprised of first and second chemically reactive materials which are arranged to be mixed when heating is required. A closure (30) closes the external cavity (20). When the heating mechanism is operated to mix the chemicals and cause an exothermic reaction, vapour, such as steam and hot air, is produced. The closure (30) carries an annular sealing flange (100) which engages with an annular shoulder (102) of the container. The sealing flange (100) seals the external cavity to atmosphere and preserves the reactivity of the chemicals therein. However, the sealing flange (100) is moved away from the shoulder (102) when the generation of the vapour increases the pressure in the external cavity (20) whereby the vapour is vented to atmosphere.

15 Claims, 2 Drawing Sheets

SELF-HEATING OR SELF-COOLING CONTAINERS

Figure 1:
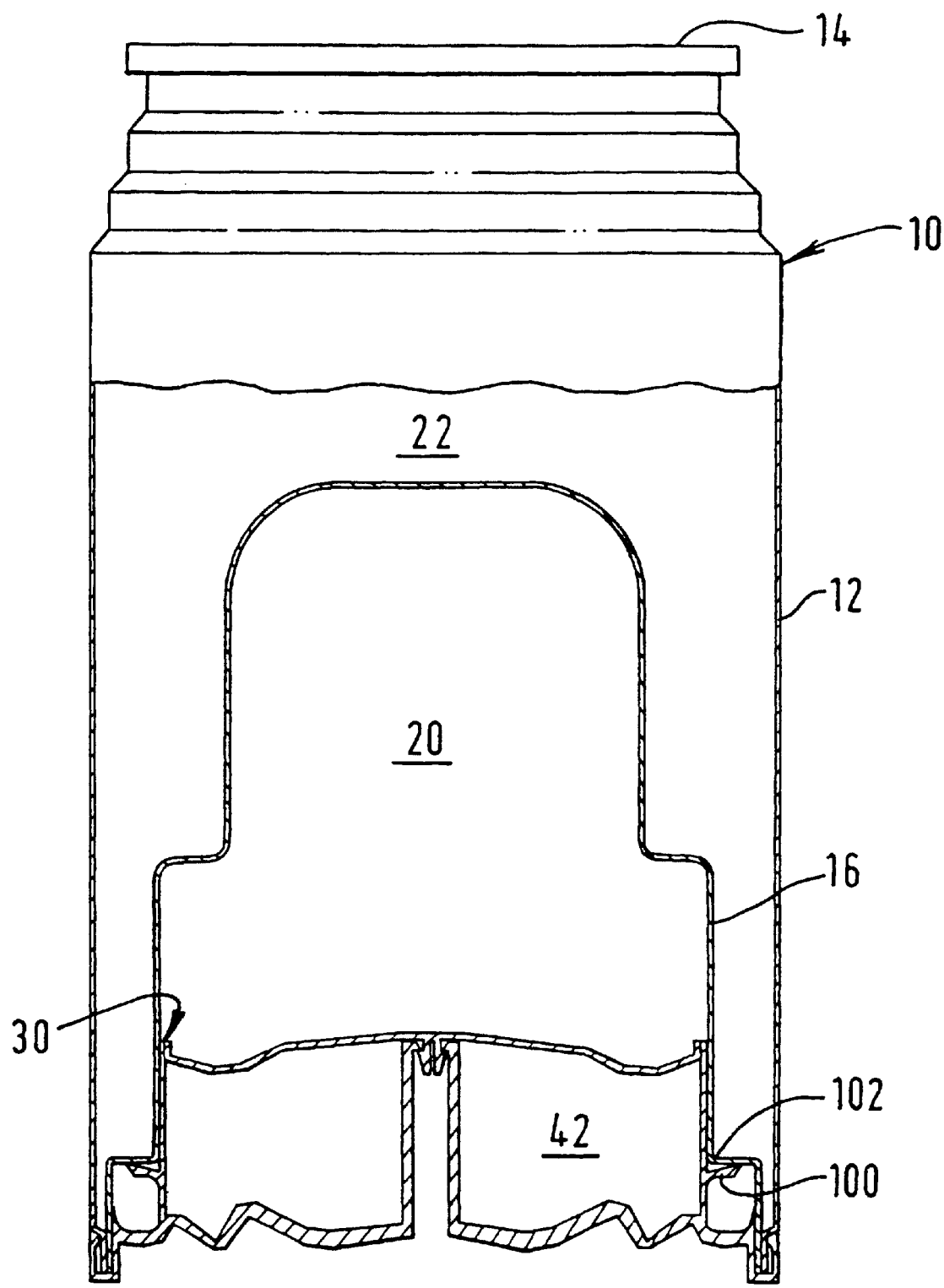

The present invention relates to a self-heating or a self-cooling container.

There have been many proposals for self-heating or self-cooling beverage containers. WO 96/29255, for example, discloses a can having the same external dimensions and shape as conventional beverage cans, but having an indented base to define an external cavity in which means to cool or heat the contents of the can are received.

Heating or cooling of the contents of the can can be achieved by using two chemical reactants which are stable when separated, but which produce an exothermic reaction or an endothermic reaction when mixed. U.S. Pat. No. 5,626,022 shows just one example, from many, of an insert for a self-heating or self-cooling can which enables mixing of the reactants when required. This construction, as is common, utilises a breakable or pierceable barrier to separate the two reactants and spikes or other piercing means to break the barrier when their reaction is required to heat or cool the can.

As indicated, self-heating containers may utilise an exothermic reaction as the energy source to heat the contents of the container. Commonly, this exothermic reaction mixes quicklime (calcium oxide) and water to produce heat. The reaction also produces steam and heated air which could lead to a potentially dangerous pressure build-up unless vented from the container in some manner. However, calcium oxide, for example, is strongly hydroscopic and needs to be kept isolated from the atmosphere to ensure that it maintains its reactivity.

There is therefore a conflict between the need to seal the reactants from the atmosphere, and the need to avoid pressure build up upon the generation of vapour from the reaction. The present invention seeks to address this conflict.

According to the present invention there is provided a self-heating or self-cooling container comprising a tubular peripheral wall within which first and second separated cavities extend, the first cavity receiving the contents of the container, and the second cavity housing a heating or cooling mechanism, a first end member closing the first cavity, and a second end member closing the second cavity, wherein said second end member comprises a closure fastened onto the peripheral wall to close the second cavity, and wherein the closure carries or supports sealing means arranged to seal the second cavity to atmosphere but to allow excess pressure in the second cavity to be vented.

With a self-heating or self-cooling container of an embodiment of the invention, vapour produced by the heating or cooling mechanism, for example, a high pressure gas produced by a cooling mechanism, or the steam and/or hot air produced by an exothermic heating reaction, is able to vent from the second cavity by way of the sealing means. However, this sealing means acts to seal the second cavity to atmosphere and hence keeps the reactants of the heating or cooling mechanism in good condition prior to use. It will appreciated that, in effect, the sealing means act as a one-way valve.

A self-heating or a self-cooling container of an embodiment of the invention may incorporate any heating or cooling mechanism. Various arrangements are described, for example, in WO 96/29255. In a preferred embodiment, the heating or cooling mechanism comprises a first chemical reactant and a second chemical reactant received within the second cavity of the container. The chemical reactants are kept apart until heating or cooling of the contents of the container is required. The chemical reactants are protected from degradation until required by the closure and its sealing means.

The closure may be of any required construction. For example, the closure may be as described in co-pending International application No. PCT/GB00/00700. The closure, as described in that earlier International application, may incorporate a container for one of the reactants of the heating or cooling mechanism. Alternatively, the closure may be configured as a simple closure for the second cavity. In an embodiment, said closure is provided with a peripheral rim which is appropriately shaped to engage onto the peripheral wall to close the second cavity, and said sealing means is a continuous sealing member carried by or supported on said closure internally of its peripheral rim.

For example, said continuous sealing member engages around an opening of said second cavity. In addition, said continuous sealing member may engage with said peripheral wall and/or with any other appropriate part of said container.

In one embodiment, said sealing member is an annular sealing flange connected to said closure and movable to enable excess pressure to be vented from the second cavity.

For example, the closure may be made of plastics material, and said sealing flange integrally formed therewith.

The shape and construction of the annular sealing flange may be chosen as required. For example, the flange may be connected to the closure at hinge means whereby the flange is movable to vent excess pressure. The hinge means may be formed by a narrowed or waisted portion of the sealing flange.

Alternatively, the sealing flange may be shaped or waisted along its length to provide for the flexibility or movement to vent the excess pressure.

In one embodiment, said sealing member is an annular, sealing ring supported to seal the second cavity, and deformable to enable excess pressure to be vented from the second cavity.

The sealing ring, for example, may be made of a squashable or deformable material such as plastics material or rubber. Thus, the sealing ring may normally have the volume to seal the second cavity against atmosphere, but may be arranged to be squashed to a smaller volume by excess pressure in the external cavity whereby the excess pressure is vented.

It will be appreciated that any construction which enables the sealing means to act in a one-way manner may be utilised. It is required, as set out above, that the sealing means seal the second cavity against atmosphere, but allows venting of excess pressure from the second cavity. In this respect, it is generally required that the sealing means flex, deform or move to vent pressure in excess of 2 psi.

The embodiments particularly described show sealing means at the periphery of the closure which are continuous in structure. However, it will be appreciated that the sealing means may be differently located and/or may be discontinuous or interrupted. If required one or more individual sealing members may be provided.

In WO 96/29255, the second cavity of the container, which supports the heating or cooling mechanism, extends within the first cavity in which the container contents are received. It will be appreciated that the invention is not limited to any particular form or structure of self-heating or self-cooling container and is applicable, for example, to a container in which the second cavity surrounds the first cavity which houses the contents. Alternatively, the first and second cavities may extend side by side.

Although it is general preferred that the end member for the first cavity is at the opposite end of the peripheral wall to that for the second cavity, this not essential. The first and second end members may, if required, both be arranged at the same end of the peripheral wall.

A self-heating or self-cooling container of the invention may be used to contain any contents which may require cooling or heating. Thus, not only is the container suitable for beverages, it may alternatively be used for foodstuffs or medicines.

Figure 2:
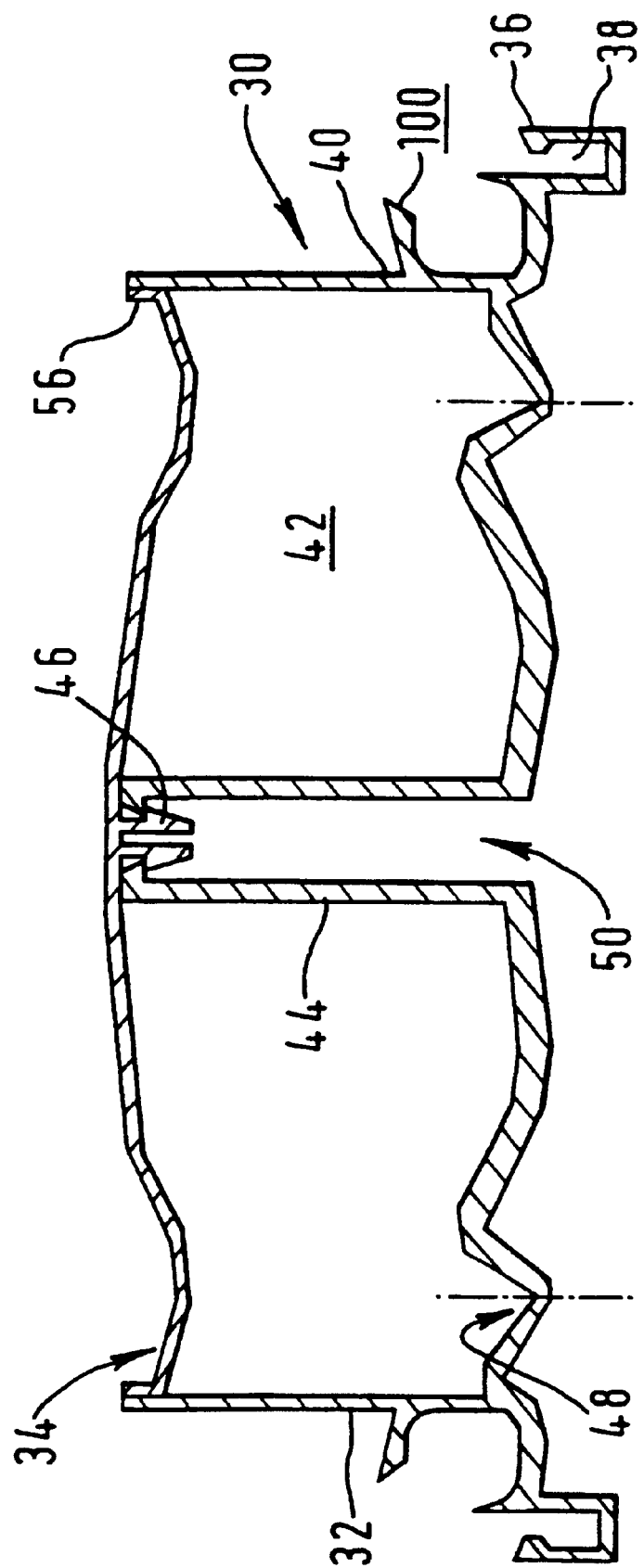

Embodiments of the present invention will hereinafter be described, by way of example, with reference to the accompanying drawings, in which:

FIG. 1 shows, partly in section, a self-heating or a self-cooling container illustrating an external reactant cavity thereof and a closure for the cavity, and FIG. 2 shows a larger view of the closure in its closed position.

The invention is described hereinafter with reference to a self-heating beverage container having a particular design of heating mechanism. However, the invention is applicable to both self-heating and self-cooling containers and finds application irrespective of the proposed contents of the container. As described, the container has an external cavity in which heating or cooling means is received, the external cavity being closed by a closure. The invention is not limited to such an arrangement and can be used with other constructions of self-heating or self-cooling mechanisms.

The container shown in FIG. 1 may be a metal or plastics material beverage container 10 having a substantially cylindrical peripheral wall 12 which is closed at one end by a top end member 14. As described in WO 96/29255, a base end member 16 of the container is indented to define an elongate external cavity 20 which extends within the peripheral wall 12. It will be appreciated that the peripheral wall 12 and the top and base members 14 and 16 of the container together define an internal cavity 22 in which the beverage is received. It will be seen that the external cavity 20 extends within this internal cavity 22, but is separated therefrom by the wall of the base member 16.

The container 10 illustrated in FIG. 1 is configured to have the same external dimensions and shape as a conventional beverage can. This means that the can can be filled and treated on existing filling lines.

The external cavity 20 of the can 10 is to be utilised to contain a heating mechanism. In the embodiment shown, the heating mechanism comprises a first reactant material, which, for example, may be quicklime (calcium oxide). The cavity 20, incorporating the quicklime, is closed by a closure 30. For the self-heating can this closure 30 may contain water.

When it is required to heat the contents of the can 10, the can is inverted and stood on its top member 14 so that the base of the closure 30 is accessible. A button, described below, on the bottom of the base is depressed whereby a water chamber 42 within the closure 30 is opened so that water from the closure 30 flows over the quicklime in the reactant cavity 20 to cause the exothermic reaction. The user retains the can in its inverted position until the contents of the can have been heated to a satisfactory temperature.

FIG. 2 shows the closure 30, which is very similar to the closure described in PCT/GB00/00700. The closure 30 defines a container for the water, as well as closing the cavity 20. The closure 30 is moulded from plastics material and comprises a base member generally indicated as 32 and a lid generally indicated as 34. The base member 32 comprises a substantially circular base having an annular peripheral rim 36. This rim defines an annular recess 38 which enables the closure 30 to be clipped onto the base of the can 10. Radially inwardly of the peripheral rim 36 is an upstanding peripheral wall 40 which defines the generally cylindrical chamber 42 for containing the water. The free end of the wall 40 defines a circular opening of the chamber 42 in which the lid 34 is received. At its centre, the base 32 has an upstanding plunger 44. In the embodiment illustrated, this plunger 44 has an open top end for receiving a fixing 46 of the lid 34.

The plunger 44 is affixed to the base centrally of a button 50 defined within the base 32 by an annular groove 48. It will be seen that in the condition shown in FIG. 2, the button 50 is convex and is radially inwardly of the annular groove 48.

The fixing of the lid 34 comprises downwardly extending projections 46 which are clipped into the top of the plunger 44 after the chamber 42 has been filled with water. It will be seen that the lid 34 also has an upstanding rim 56 which, when the lid 34 is snap fitted into position, is received within the opening defined by the upstanding wall 40. The lid 34 is also shaped radially inwardly of the rim 56 in a manner such that any pressure generated within the chamber 42 tends to force the rim 56 into tighter contact with the internal surface of the opening of the chamber 42.

When a closure as 30 is clipped onto a can 10 as shown in FIG. 1 it acts to keep the quicklime within the cavity 20 and to retain the water in the chamber 42 but reliably separated from the quicklime.

When self-heating of the can 10 is required it is inverted as described above. The button 50 is pressed. The button 50 is arranged to have an over-centre action such that, on depression, the button moves from its initial convex domed position to a substantially concave domed position. Preferably, the button is stable in both of its states. This movement of the button 50 moves the plunger 44 in a direction to push the lid 34 out of the opening of the chamber 42. Generally, it is expected that depression of the button 50 will cause a positive opening of the lid 34 of the chamber 42 whereby water is quickly released into the quicklime of the cavity 20 to commence the self-heating reaction. However, because the container 10 is inverted, it does not matter if positive and full opening of the lid does not occur. In this respect, as long as there is some opening of the lid, flow of the water from the chamber 42 will begin and this will, in itself, tend to ensure fuller opening of the lid.

The self-heating container described and illustrated can be filled on conventional filling lines, and the contents thereof may be subjected to any treatments required, such as sterilisation or pasteurisation. Thereafter, it is a simple matter to invert each completed and filled container, fill its external cavity with an appropriate charge of quicklime, and then clip on a closure which is already filled with water. Generally, it is preferred to simply clip the closure 30 onto the container 10, but it may be provided with screw threads or other fixing means.

The embodiment described above employs a particular form of closure 30 configured as a fluid container. In an alternative embodiment, the fluid container may be omitted, for example, by omitting the upstanding wall 40 and the lid 34. The base 32 then forms a closure able to clip onto the can 10 to close the external cavity 20 therein. Appropriate heating means, for example, are provided within the external cavity 20. Such a closure may be provided with a button as 50, and/or with a plunger as 44 to operate the heating means provided.

Quicklime is strongly hydroscopic and therefore needs to be sealed against atmosphere to preserve its reactivity. In addition, once the chemical reaction occurs, steam and hot air are created. For safety, it is required the vent that steam and hot air from the container rather than allowing excess pressure to build up within the external cavity 20. These two requirements, of course, conflict.

A closure of an embodiment of the present invention is provided with a one way seal 100 which is arranged to seal the external cavity 20 against atmosphere whilst allowing excess pressure to be vented. As indicated in the drawings, the one way seal is provided by an annular sealing flange 100 integrally formed with the closure 30 and extending radially with respect to its upstanding wall 40. The sealing flange 100 is positioned and shaped such that when the closure 30 is in position to close the external cavity 20, the sealing flange 100 abuts an annular shoulder 102 formed in the base end member 16.

The sealing flange 100 is made of plastics material, as is the closure 30, and is arranged to have an appropriate amount of flexibility. It will be appreciated that the application of atmospheric pressure thereto tends to push the sealing flange 100 against the shoulder 102 whereby the seal is maintained and the quicklime within the external cavity 20 is sealed from the atmosphere. However, when the pressure within the external cavity 20 exceeds a predetermined level, it is able to flex or deform the sealing flange 100 out of contact with the annual shoulder 102 whereby a path for venting excess pressure is defined. In this respect, microgrooves (not shown) may be provided in the annular recess 38 of the closure 30 to allow the air and steam to vent to the exterior of the container. Additionally and/or alternatively vents or recesses (not shown) may be formed in the periphery of the closure 30 or in the wall of the cavity 20 or in both. It will be appreciated that any paths provided for the exit of steam will be sealed by the seal 100 until it is moved by excess pressure in the external cavity 20.

The sealing means may be configured and arranged as required. It is needed to preserve the integrity of the contents of the external cavity 20 by sealing the cavity from atmosphere but to be flexible, movable, or deformable when the pressure in that cavity exceeds the predetermined level which may be, for example, 2 psi or more.

The flexibility of the sealing flange 100 may arise out of its material and/or its shape. Waisted or necked potions (not shown) may be incorporated within the body of the sealing flange 100 to provide flexibility and/or allow for hinged movements.

In an alternative embodiment, a sealing ring (not shown) may be supported by the closure 30 around the exterior of its upstanding wall 40 to abut the shoulder 102 and provide the necessary seal. The sealing ring may be made of a squashable or deformable material such as plastics material or rubber whereby it is reduced in volume by the excess pressure in the external cavity 20 and thereby enables venting thereof.

In the embodiment illustrated, the sealing flange 100 extends continuously around the periphery of the upstanding wall 40 of the closure 30. It will be appreciated that the sealing flange may extend around part only of the periphery of the wall 40 and/or that an interrupted annular seal may be provided. Additionally and/or alternatively, sealing means, having the required one-way action, may be provided centrally of the closure 30. Such an arrangement is particularly useful where the container 42 of the closure 30 is omitted. In that eventuality, one way vents, for example, may be provided in the base 32 of the closure 30 around the plunger 44 and/or around the button 50.

It will be appreciated that other variations or modifications to the embodiments as described and illustrated may be made within the scope of the appended claims.

What is claimed is:

1. A self-heating or self-cooling container comprising a tubular peripheral wall within which first and second separated cavities extend, the first cavity receiving the contents of the container, and the second cavity housing a heating or cooling mechanism, a first end member closing the first cavity, and a second end member closing the second cavity, wherein said second end member comprises a closure fastened onto the peripheral wall to close the second cavity, and wherein the closure carries or supports means for allowing excess pressure in the second cavity to be vented, wherein said means for allowing venting of said second cavity comprises a sealing member, the sealing member being carried or supported by said closure and being engageable with said peripheral wall to seal the second cavity to atmosphere.

2. The self-heating or self-cooling container of claim 1, wherein said closure is provided with a peripheral rim which is appropriately shaped to engage onto the peripheral wall to close the second cavity, and wherein said sealing means is a continuous sealing member carried by or supported on said closure internally of its peripheral rim.

3. The self-heating or self-cooling container of claim 2, wherein said closure has a substantially circular periphery, and its peripheral rim is annular, and wherein an annular groove is defined in the closure by said peripheral rim.

4. The self-heating or self-cooling container of claim 2, wherein said continuous sealing member engages around an opening of said second cavity.

5. The self-heating or self-cooling container of claim 1, wherein said sealing member is an annular sealing flange connected to said closure and movable to enable excess pressure to be vented from the second cavity.

6. The self-heating or self-cooling container of claim 5, wherein said closure is made of plastics material, and said sealing flange is integrally formed therewith.

7. The self-heating or self-cooling container of claim 5, wherein said closure has a substantially circular periphery and has an peripheral rim which is annular, and wherein an annual groove is defined in the closure by said peripheral rim.

8. The self-heating or self-cooling container of claim 1, wherein said sealing member is an annular sealing ring, the annual sealing ring being supported to seal the second cavity and deformable to enable excess pressure to be vented from the second cavity.

9. The self-heating or self-cooling container of claim 8, wherein said sealing ring is made of one of a deformable plastics and a rubber material.

10. The self-heating or self-cooling container of claim 6, wherein said closure has a substantially circular periphery, and has a peripheral rim which is annular, and wherein an annual groove is defined in the closure by said peripheral rim.

11. The self-heating or self-cooling container of claim 1, wherein said closure has operating means to actuate said heating or cooling mechanism.

12. The self-heating or self-cooling container of claim 11, wherein said operating means comprises a plunger affixed to said closure and upstanding therefrom.

13. The self-heating or self-cooling container claim 12, wherein the plunger is integrally formed with the closure.

14. The self-heating or self-cooling container of claim 13, wherein the plunger is mounted on the Closure by way of a button formed in the closure.

15. The self-heating or self-cooling container of claim 1, wherein said second cavity extends within the first cavity, and the first cavity opens at one end of the peripheral wall and the second cavity opens at the other, opposite, end of the peripheral wall.

* * * * *